(12) United States Patent
Hoshi (10) Patent No.: US 10,309,322 B2
(45) Date of Patent: Jun. 4, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Kenji Hoshi, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/895,780

(22) Filed: Feb. 13, 2018

(65) Prior Publication Data

US 2018/0298832 A1    Oct. 18, 2018

(30) Foreign Application Priority Data

Apr. 12, 2017  (JP) .................. 2017-078943

(51) Int. Cl.
*F02D 13/02* (2006.01)
*F02D 41/34* (2006.01)
(Continued)

(52) U.S. Cl.
CPC ...... *F02D 13/0211* (2013.01); *F02D 41/0245* (2013.01); *F02D 41/064* (2013.01); *F02D 41/3041* (2013.01); *F02D 41/3094* (2013.01); *F02D 41/34* (2013.01); *F02D 41/402* (2013.01); *F02D 43/00* (2013.01); *F02M 61/14* (2013.01); *F02M 61/182* (2013.01); *F02P 5/1502* (2013.01); *F02P 5/1506* (2013.01);
(Continued)

(58) Field of Classification Search
CPC ...... F02D 13/0211; F02D 41/34; F02D 43/00; F02M 61/182; F02M 61/14; F02P 5/1502; F02B 23/105; F02B 23/0696; F02B 23/0672; F02B 23/0651; F02B 2275/14; F02B 23/0621; F02B 23/0669; F02B 23/0693; F02B 23/0624; F02B 23/0603; F02B 23/06; F02F 3/00; F02F 3/26; F02F 3/28

See application file for complete search history.

(56) References Cited

U.S. PATENT DOCUMENTS

2002/0134346 A1* 9/2002 Yamauchi ............. F02B 23/104
123/295
2002/0189582 A1* 12/2002 Mamiya ................. F02D 37/02
123/295
(Continued)

FOREIGN PATENT DOCUMENTS

JP  H11-280522 A  10/1999
JP  2000-282920 A  10/2000
(Continued)

*Primary Examiner* — Sizo B Vilakazi
(74) *Attorney, Agent, or Firm* — Hunton Andrews Kurth LLP/HAK (57) ABSTRACT

When it is determined that the initial combustion is unstable, the engine speed is forcibly increased. When the engine speed is forcibly increased, fluidity in the cylinder increases. When the fluidity in the cylinder rises, homogeneity of the homogeneous air-fuel mixture is improved. Therefore, it is possible to enlarge the flame kernel. When the flame kernel is enlarged, the initial flame resulting from the flame kernel is also enlarged. Then, the initial flame becomes easy to involve the closest fuel spray thereby the initial combustion can be stabilized.

3 Claims, 9 Drawing Sheets

(51) Int. Cl.

| | | |
|---|---|---|
| *F02M 61/18* | (2006.01) | |
| *F02M 61/14* | (2006.01) | |
| *F02D 43/00* | (2006.01) | |
| *F02P 5/15* | (2006.01) | |
| *F02D 41/02* | (2006.01) | |
| *F02D 41/06* | (2006.01) | |
| *F02D 41/30* | (2006.01) | |
| *F02D 41/40* | (2006.01) | |
| *F02D 29/02* | (2006.01) | |
| *F02B 23/10* | (2006.01) | |
| *F01N 3/28* | (2006.01) | |
| *F01N 3/20* | (2006.01) | |
| *F02D 45/00* | (2006.01) | |
| *F02D 41/00* | (2006.01) | |

(52) U.S. Cl.
CPC ............ *F01N 3/204* (2013.01); *F01N 3/2896* (2013.01); *F02B 23/105* (2013.01); *F02D 29/02* (2013.01); *F02D 45/00* (2013.01); *F02D 2041/001* (2013.01); *F02D 2041/0015* (2013.01)

(56) References Cited

U.S. PATENT DOCUMENTS

2003/0121495 A1\* 7/2003 Abo ...................... F02B 17/005
                                                                            123/295
2018/0306135 A1\* 10/2018 Hayashi ................. F02B 31/00

FOREIGN PATENT DOCUMENTS

| JP | 2008-190511 A | 8/2008 |
|---|---|---|
| JP | 2009-185688 A | 8/2009 |
| JP | 2011-106377 A | 6/2011 |

\* cited by examiner

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2017-78943, filed on Apr. 12, 2017. The contents of these applications are incorporated herein by reference in their entirety.

TECHNICAL FIELD

The present disclosure relates to a control device for an internal combustion engine, and more particularly to a control device for an internal combustion engine which is configured to control a spark ignition engine comprising an injector which is configured to inject fuel into a cylinder of the engine.

BACKGROUND

JP2011-106377A discloses an engine comprising an injector which is configured to inject fuel into a cylinder and a spark plug which is configured to ignite air-fuel mixture in the cylinder. The injector and the spark plug are provided at an upper portion of a combustion chamber of the engine. The injector includes multiple injection ports. The injection ports include a inject port of which a central position is located closest to a central position of a discharge gap of the spark plug. In this engine, a distance between the central position of the central position of the discharge gap and that of the closest inject port is set in advance a certain distance.

The patent publication also discloses an engine control method in which a high voltage is applied to the spark plug between after a lapse of a predetermined time from the start of fuel injection from the injector and the end of the fuel injection. To put it briefly, the engine control is a control in which an injection period is overlapped with an ignition period. The fuel splay immediately after the injection proceeds in the injection direction while taking away the surrounding air. Therefore, a low pressure part is formed in the injection period (entrainment). On the other hand, a discharge spark is generated on the discharge gap in the ignition period. Then, when the engine control in which an injection period is overlapped with an ignition period is performed, the discharge spark is attracted by the low pressure part. According to such attraction operation, the ignitability of the air-fuel mixture formed around the spark plug can be improved.

In addition, the patent publication discloses an activation control of an exhaust gas cleaning catalyst at engine start as an application example of the attraction action. Although the patent publication does not refer to, the activation control of the exhaust gas cleaning catalyst is generally performed by setting the ignition period on a retard side relative to compression top dead center. Therefore, an activation control to which the attraction action is applied means an engine control in which the fuel injection period is overlapped with the ignition period which is set on the retard side relative to the compression top dead center.

The present inventor is considering another activation control of the exhaust gas cleaning catalyst based on an engine in which a tumble flow is formed. The engine under consideration comprises an injector and a spark plug. The injector of the consideration includes multiple injection ports. The spark plug of the consideration is provided on a downstream side of the injector when viewing in a tumble flow direction at an upper part of a combustion chamber of the engine under consideration. More specifically, the spark plug is provided on a downstream side relative to a fuel spray which is located closest to the spark plug among the fuel sprays injected from the multiple injection ports, and also is provided on an upper side of a contour surface of the closest fuel spray.

The engine control under consideration is an engine control in which a first fuel injection being overlapped with the ignition period on a retard side relative to compression top dead center and a second fuel injection on an advance side relative to the compression top dead center are performed. The first fuel injection forms an air-fuel mixture which swirls in the tumble flow direction. The second fuel injection produces the low pressure part described above. Therefore, when the engine control under consideration is performed, not only the discharged spark generated in the ignition period but also an initial flame generated from the discharged spark and the air-fuel mixture are attracted to the low pressure part. Here, the air-fuel mixture causing the initial flame is derived from the first fuel injection. The initial flame attracted to the low pressure part grows in contact with the fuel spray derived from the second fuel injection and then expands by involving a remaining air-fuel mixture in the combustion chamber. The remaining air-fuel mixture is derived from the first fuel injection and has not contributed to the generation of the initial flame.

The present inventor discovered following problem in thinking of the engine control under consideration. As mentioned above, in the engine premised on the engine control under consideration, the spark plug is provided on the downstream side of the injector when viewing in the tumble flow direction at the upper part of the combustion chamber. Therefore, when comparatively strong tumble flow is generated in the combustion chamber, the initial flame and the fuel sprays move strongly. Then, despite the attraction by the low pressure part, the initial flame and the fuel sprays are not able to come in contact with the fuel spray derived from the second fuel injection and thus the combustion may become unstable. Then, when such a situation occurs frequently in the combustion cycles, combustion fluctuation between cycles increase to affect performance of the engine.

The present disclosure addresses the above described problem, and an object of the present disclosure is, in the internal combustion engine equipped with an injector provided at an upper part of a combustion chamber and a spark plug provided downstream of the injector in tumble flow direction at the upper part, to stabilize combustion during an engine control in which an ignition period by the spark plug is overlapped with a fuel injection period.

SUMMARY

The present disclosure provides a control device for an internal combustion engine which is configured to control an engine comprising an injector, a spark plug and an exhaust gas cleaning catalyst.

The injector is provided at an upper portion of a combustion chamber where tumble flow is generated. The injector is configured to inject fuel into a cylinder from multiple injection ports.

The spark plug is provided at the upper portion and is configured to ignite a fuel-air mixture inside the cylinder by using a discharge spark. The spark plug is provided on a downstream side relative to the injector in a tumble flow direction at the upper portion. The spark plug is located at the downstream side of closest fuel spray among the fuel sprays injected from the multiple injection ports and is located closer to the upper portion than a contour surface of the closest fuel spray.

The exhaust gas cleaning catalyst is configured to clean exhaust gas from the combustion chamber.

The control device is configured to perform an engine control for activating the exhaust gas cleaning catalyst. In the engine control, the spark plug is controlled so as to generate discharge spark at an ignition period on a retard side of compression top dead center. In the engine control, the injector is controlled so that a first injection is performed on an advance side of the compression top dead center and a second injection whose injection period is overlapped with at least a part of the ignition period is performed on the retard side of the compression top dead center.

The control device is further configured to perform an engine control in which rotation speed of the engine is forcibly increased when it is determined that a parameter relative to stability of the initial combustion exceeds a threshold.

When the initial combustion is unstable, the parameter relative to the stability of the initial combustion exceeds the threshold. In such a case, if the rotational speed of the engine is forcibly increased, the fluidity in the cylinder increases. When the fluidity in the cylinder increases, homogeneity of homogeneous air-fuel mixture in the cylinder is improved. When the homogeneity is improved, initial flame generated from the homogeneous air-fuel mixture in the ignition period is enlarged. Then, the enlarged initial flame becomes easy to involve fuel spray derived from the second injection, and thus, the combustion to grow initial flame (i.e. the initial combustion) can be stabilized.

In cycles after increasing the rotational speed, when it is determined that the parameter exceeds the threshold again, the control device may be further configured to perform an engine control in which the injector is controlled so that injection amount for the first injection is increased.

In spite of the forced increase in the rotational speed, when the initial combustion is still unstable, the parameter relative to the stability of the initial combustion exceeds the threshold again. In such as case, if the injection amount for the first injection is increased, fuel concentration of the homogeneous air-fuel mixture is increased. When the fuel concentration is increased, the fuel concentration around the spark plug and the discharge spark are also increased. Then, the combustion to grow initial flame can be stabilized.

In cycles after increasing the rotational speed, when it is determined that the parameter exceeds the threshold again, the control device may be further configured to perform an engine control in which the injector is controlled so that the first injection is performed a plurality of times.

In spite of the forced increase in the rotational speed, when the initial combustion is still unstable, the parameter relative to the stability of the initial combustion exceeds the threshold again. In such as case, if the first injection is performed a plurality of times, the homogeneity is improved. Then, the combustion to grow initial flame can be stabilized.

According to the control device of the present disclosure, in the internal combustion engine equipped with the injector provided at the upper part and the spark plug provided downstream of the injector in tumble flow direction at the upper part, it is possible to stabilize combustion during the engine control in which the ignition period by the spark plug is overlapped with the fuel injection period.

DESCRIPTION OF EMBODIMENTS

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

Figure 1:
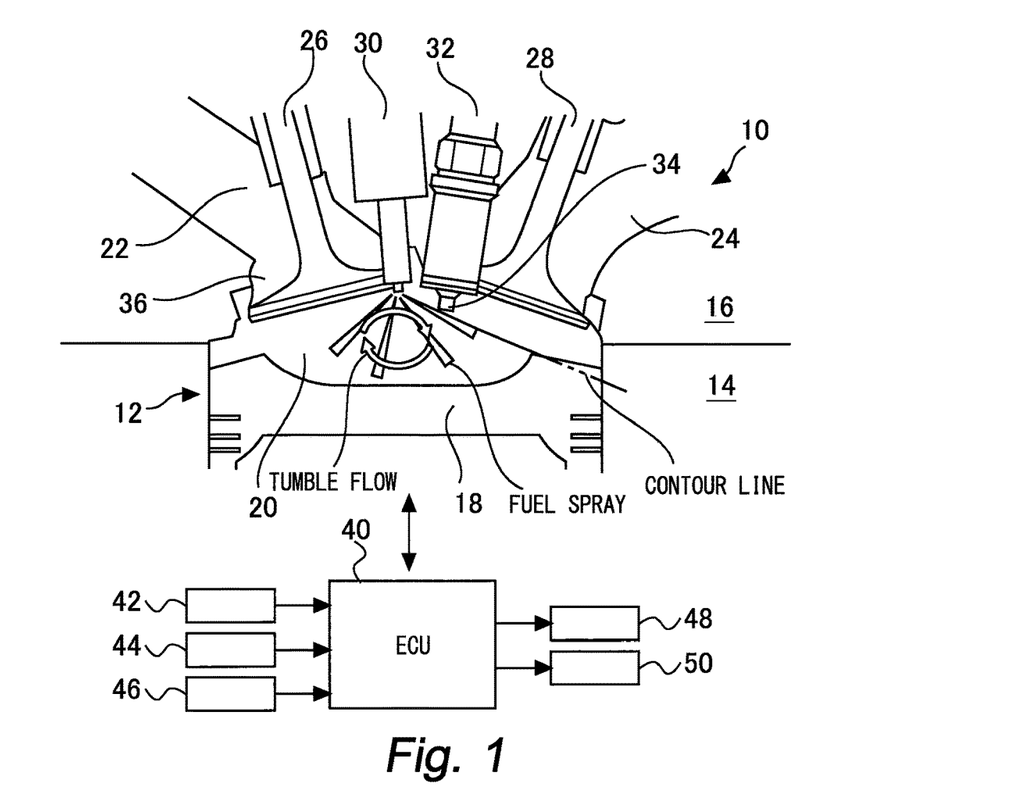
FIG. 1 is a view for describing a system configuration according to a first embodiment of the present disclosure.

First, a first embodiment of the present disclosure will be described referring to FIG. 1 to FIG. 9.
[Description of System Configuration]
FIG. 1 is a view for describing the system configuration according to the first embodiment. As illustrated in FIG. 1, a system according to the present embodiment includes an internal combustion engine (hereinafter also referred to as an "engine") 10 that is mounted in a vehicle. The engine 10 is a four-stroke, one-cycle engine that has a plurality of cylinders. However, only one cylinder 12 among the plurality of cylinders is depicted in FIG. 1. The engine 10 has a cylinder block 14 in which the cylinder 12 is formed, and a cylinder head 16 that is disposed above the cylinder block 14. In the cylinder 12, a piston 18 is arranged that reciprocates in the axial direction thereof (the vertical direction in the present embodiment). A combustion chamber 20 of the engine 10 is defined by at least a wall surface of the cylinder block 14, a bottom face of the cylinder head 16 and a top face of the piston 18.

In the cylinder head 16, two intake ports 22 and two exhaust ports 24 which communicate with the combustion chamber 20 are formed. An intake valve 26 is provided at an opening portion that communicates with the combustion chamber 20 of each intake port 22. An exhaust valve 28 is provided at an opening portion that communicates with the combustion chamber 20 of each exhaust port 24. An injector 30 is provided in the cylinder head 16 so that a tip thereof faces the combustion chamber 20 from approximately the center of an upper portion of the combustion chamber 20. The injector 30 is connected to a fuel supply system that is constituted by a fuel tank, a common rail, a supply pump and the like. A plurality of injection ports are formed in a radial shape in the tip of the injector 30. When the injector 30 is opened, fuel is injected in a high pressure state from the injection ports.

In the cylinder head 16, a spark plug 32 is provided at an upper portion of the combustion chamber 20 at a position that is further to the side of the exhaust valve 28 in comparison to the location at which the injector 30 is provided. The spark plug 32 includes, at the tip thereof, an electrode portion 34 that is constituted by a center electrode and a ground electrode. The electrode portion 34 is arranged so as to project into an area that is above a contour surface of a fuel spray (hereinafter also referred to as "spray contour surface" of the injector 30 (that is, into an area from the spray contour surface to the bottom face of the cylinder head 16)). More specifically, the electrode portion 34 is arranged so as to project into an area that is above a contour surface of a fuel spray that comes closest to the spark plug 32 among fuel sprays (hereinafter also referred to as a "closest fuel spray") ejected in a radial shape from the injection ports of the injector 30. Note that, a contour line drawn in FIG. 1 represents a contour surface of the closest fuel spray.

The intake port 22 extends approximately straight in the direction of the combustion chamber 20 from an inlet on the intake passage side, and the channel cross-sectional area is narrowed down at a throat 36 that is a connecting portion with the combustion chamber 20. This shape of the intake port 22 generates a tumble flow in intake air that is supplied from the intake port 22 to the combustion chamber 20. The tumble flow swirls inside the combustion chamber 20. More specifically, at the upper portion of the combustion chamber 20 the tumble flow moves from the intake port 22 side toward the exhaust port 24 side, and on the exhaust port 24 side the tumble flow moves from the upper portion of the combustion chamber 20 toward the lower portion thereof. Further, at the lower portion of the combustion chamber 20 the tumble flow moves from the exhaust port 24 side to the intake port 22 side, and on the intake port 22 side the tumble flow moves from the lower portion of the combustion chamber 20 toward the upper portion thereof. A depression for holding the tumble flow is formed in the upper face of the piston 18 that forms the bottom portion of the combustion chamber 20.

In the present embodiment, tumble ratio TR of the tumble flow (angular velocity of the tumble flow/engine speed) is set to a high value of 3.5 or more. The reason for this is that the engine 10 is configured to aim at a high compression ratio and massive introduction of EGR gas in an operation region with high use frequency. As the compression ratio increases, turbulence in the cylinder decreases. Therefore, when a large amount of EGR gas is introduced into the cylinder with low turbulence, the combustion resistance in the above operation region decreases. For this reason, the tumble ratio TR is set to the high value. Note that the tumble flow is not limited to the one generated by the throat 36. For example, the tumble flow may be generated by controlling an opening degree of a tumble control valve TCV which is provided in the intake path such as the intake port 22.

Further, as illustrated in FIG. 1, the system according to the present embodiment includes an ECU (electronic control unit) 40 as control means. The ECU 40 includes a RAM (random access memory), a ROM (read only memory), a CPU (central processing unit) and the like. The ECU 40 performs processing to take in signals of various sensors that are mounted in the vehicle. The various sensors include at least a pressure sensor 42 that is configured to detect pressure in the cylinder (in-cylinder pressure), a crank angle sensor 44 that is configured to detect a rotation angle of a crankshaft that is connected to the piston 18, and a temperature sensor 46 that is configured to detect a coolant temperature or an oil temperature of the engine 10. The ECU 40 processes the signals of the respective sensors that are taken in, and actuates various actuators in accordance with a predetermined control program. The actuators that are operated by the ECU 40 include at least the injector 30 and the spark plug 32.

[Startup Control by ECU 40]

In the first embodiment, the ECU 40 shown in FIG. 1 performs a control in which activation of an exhaust gas cleaning catalyst is promoted (hereinafter also referred to as "catalyst warm-up control") as an engine control being performed immediately after a cold startup of the engine 10. The exhaust gas cleaning catalyst is a catalyst that is provided in an exhaust passage of the engine 10. A three-way catalyst that purifies nitrogen oxides (NOx), hydrocarbon (HC) and carbon monoxide (CO) contained in exhaust gas when the atmosphere of the catalyst that is in an activated state is in the vicinity of stoichiometry may be mentioned as one example of the exhaust gas cleaning catalyst. The catalyst warm-up control is performed in a preset period in which a transmission gear is in a neutral state after the start of the engine 10. The preset period is calculated by the ECU 40 based on the detected value of the temperature sensor 46 at the cold startup of the engine 10.

Figure 2:
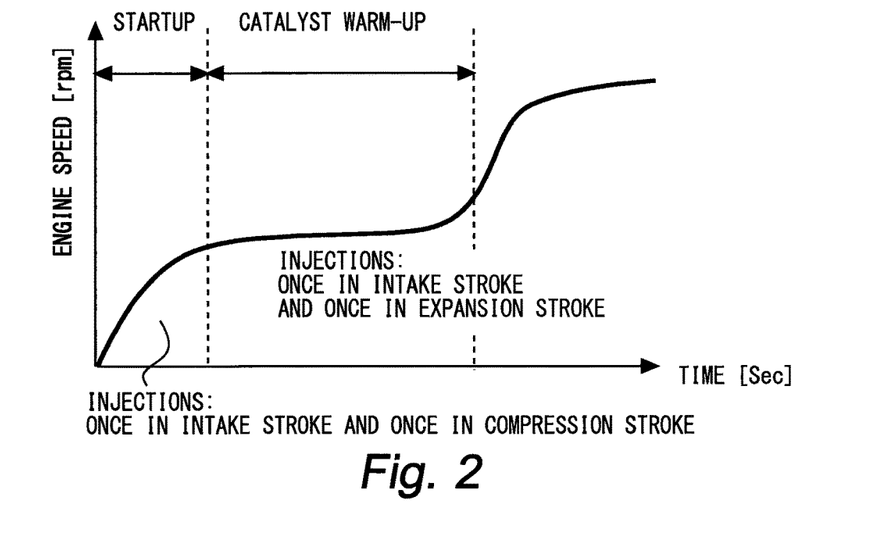
FIG. 2 is a view for illustrating an example of a fuel injection pattern immediately after startup of an internal combustion engine 10.

The catalyst warm-up control will now be described referring to FIGS. 2 to 4. FIG. 2 illustrates an example of a fuel injection pattern immediately after the cold startup of the engine 10. As illustrated in FIG. 2, immediately after startup, first, a fuel injection pattern is adopted in which a single injection in an intake stroke (hereinafter also referred to as an "intake stroke injection") and a single injection in a compression stroke (hereinafter also referred to as a "compression stroke injection") are combined. Thereafter, the fuel injection pattern is changed so as to start the catalyst warm-up control. More specifically, the compression stroke injection is switched to a single injection in an expansion stroke (hereinafter also referred to as "expansion stroke injection"). That is, in the catalyst warm-up control, a fuel injection pattern that combines the intake stroke injection and the expansion stroke injection is adopted.

Figure 3:
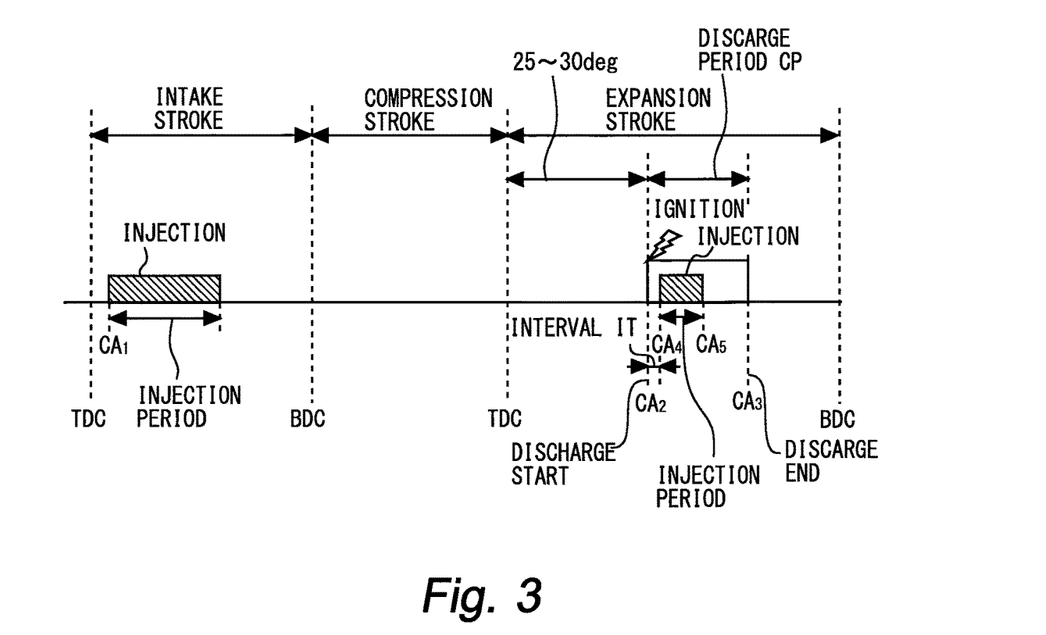
FIG. 3 is a view for illustrating injection start timings, injection periods and a discharge period at an electrode portion during catalyst warm-up control.
Figure 4:
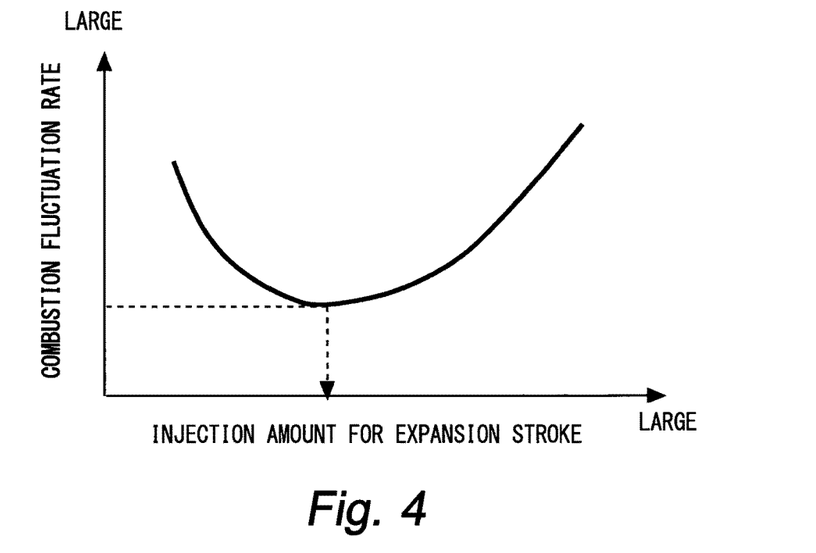
FIG. 4 is a view for illustrating a relation between a combustion fluctuation rate and a fuel injection amount for an expansion stroke injection.

FIG. 3 illustrates injection start timings, injection periods, and a discharge period at the electrode portion during catalyst warm-up control. As illustrated in FIG. 3, the intake stroke injection is started at a crank angle $CA_1$ (as one example, in the vicinity of BTDC 280°). The discharge period CP of the electrode portion is set in a retard side of TDC (i.e. compression top dead center). The reason why the discharge period CP is in the retard side of TDC is to raise the exhaust gas temperature. The expansion stroke injection is performed during the discharge period CP. More specifically, the discharge period CP is set from a crank angle $CA_2$ (as one example, in the vicinity of ATDC 25° to 35°) to a crank angle $CA_3$. The expansion stroke injection is started at a crank angle $CA_4$ on the retard side relative to the crank angle $CA_2$ and ended at a crank angle $CA_5$ on the advance side relative to the rank angle $CA_3$.

Although FIG. 3 illustrates an interval IT between the crank angle $CA_2$ and the crank angle $CA_4$. However, the interval IT may be zero. That is, the crank angle $CA_2$ may match the crank angle $CA_4$. Moreover, the interval IT may be a negative value. That is, the crank angle $CA_4$ may be positioned on the advance side relative to the crank angle $CA_2$. The relation between the crank angle $CA_2$ and the crank angle $CA_4$ also holds between the crank angle $CA_3$ and the crank angle $CA_5$. In other words, the crank angle $CA_5$ may match the crank angle $CA_3$ or may be positioned on the advance side relative to the crank angle $CA_3$. The crank angles $CA_2$, $CA_3$, $CA_4$ and $CA_5$ can be set as long as at least a part of the injection period of the expansion stroke injection overlaps with the discharge period CP. This is because that an attraction action described later is obtained if the overlap condition is fulfilled.

The injection period of the expansion stroke period is preset based on a relation between a fuel injection amount for the expansion stroke injection and a combustion fluctuation rate. The combustion fluctuation rate is obtained under equivalent operating conditions as the operating conditions during the catalyst warm-up control. An example of this relation is illustrated in FIG. 4. As illustrated in FIG. 4, the combustion fluctuation rate obtained under equivalent operating conditions as the operating conditions during the catalyst warm-up control has a downwardly convex shape within a specific fuel injection amount range. The injection period of the expansion stroke period is set as an injection period corresponding to a fuel injection amount when the combustion fluctuation rate becomes smallest (as one example, from 3 to 5 mm³/st).

[Catalyst Warm-Up Control Utilizing Attraction Action and Issue Relating Thereto]

Figure 5:
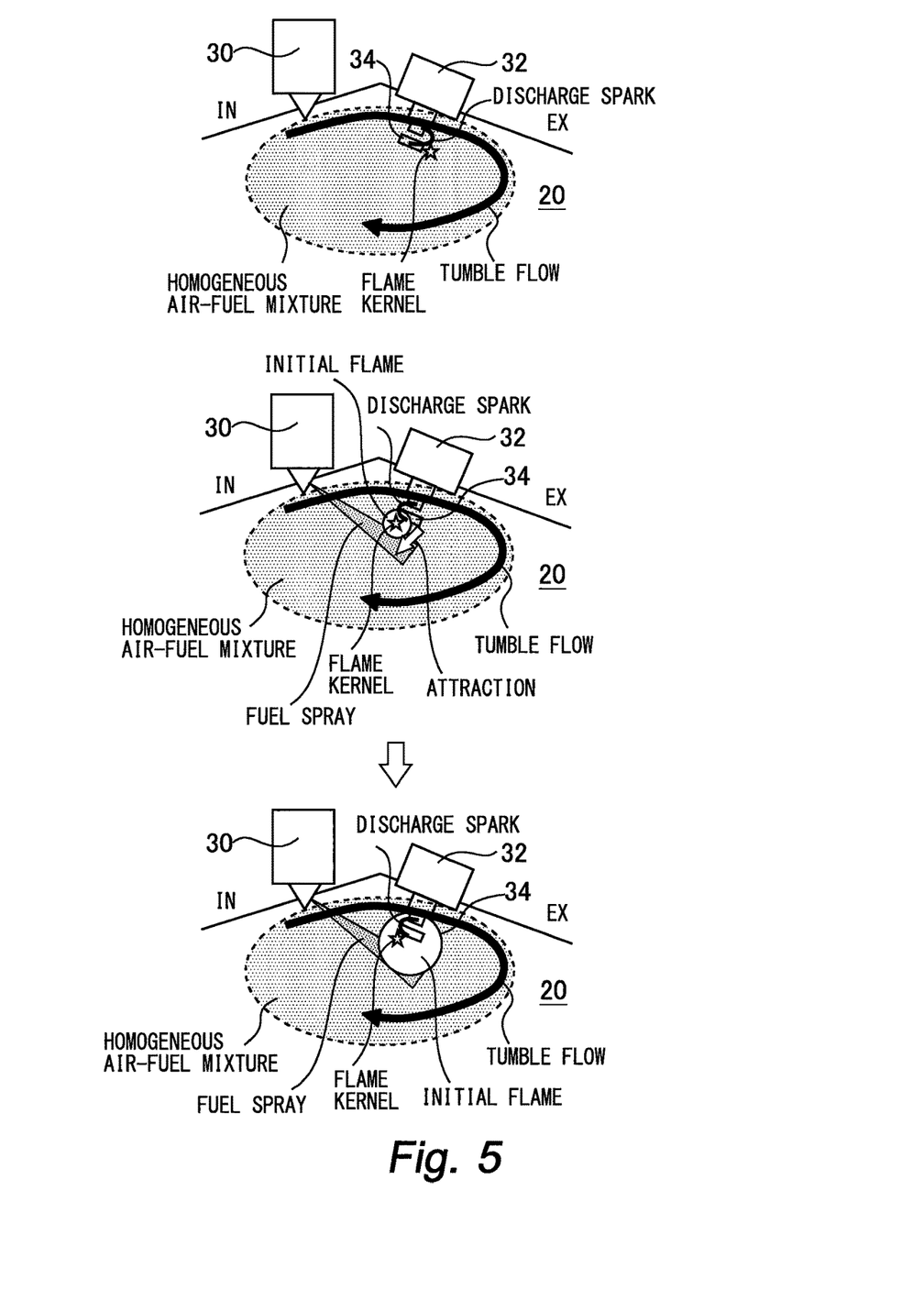
FIG. 5 is a view for describing an attraction action caused by the expansion stroke injection.

FIG. 5 is a view for describing an attraction action caused by the expansion stroke injection. Note that, for convenience of description, only the closest fuel spray is illustrated in FIG. 5. The upper diagram in FIG. 5 illustrates a cylinder condition immediately before the expansion stroke injection during the discharge period of the electrode portion 34. As shown in the upper diagram, during the discharge period of the electrode portion 34, a flame kernel is generated from the discharged spark at the electrode portion 34 and a homogeneous air-fuel mixture in the combustion chamber 20. The homogeneous air-fuel mixture is an air-fuel mixture derived from the fuel spray at the intake stroke injection. As shown in the same diagram, the discharge spark is extended in the tumble flow direction. The flame kernel is carried away in the tumble flow direction.

The middle diagram in FIG. 5 illustrates a cylinder condition immediately after the expansion stroke injection. As shown in the middle diagram, when the expansion stroke injection is performed, a low pressure part is formed around the closest fuel spray (entrainment). Then, the discharge spark and an initial flame generated from the flame kernel are attracted by the closest fuel spray. Thus, the initial flame expands by involving the closest fuel spray. A lower diagram in FIG. 5 illustrates a cylinder condition immediately after cylinder condition shown in the middle diagram. As shown in the lower diagram, the initial flame further expands by involving the closest fuel spray. According to the attraction action utilizing the expansion stroke injection, it is possible to stabilize combustion for growing the initial flame generated from the homogeneous air-fuel mixture (hereinafter also referred to as an "initial combustion").

Figure 6A:
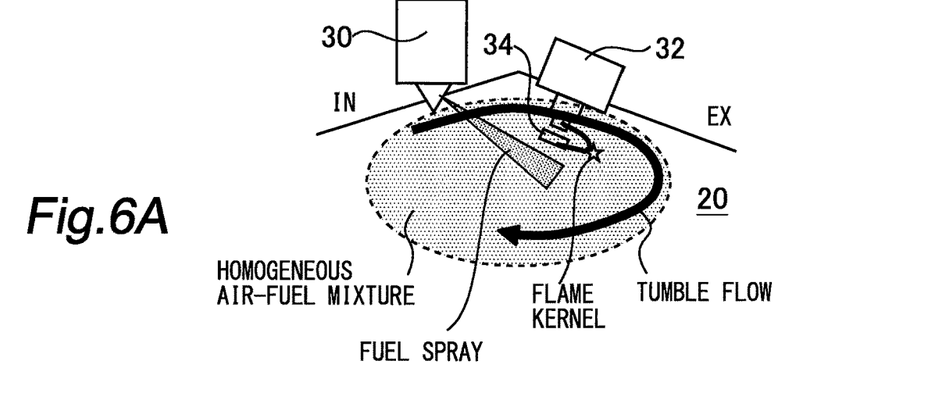
FIG. 6A to 6C are views for describing a problem in the catalyst warm-up control utilizing the attraction action.

As mentioned above, the tumble ratio TR is set to the high value in the present embodiment. The reason for this is, as mentioned above, to suppress deterioration of the combustion resistance in the operation region where a large amount of EGR gas is introduced into the cylinder. Tumble flow with such a high tumble ratio TR is generated during the catalyst warm-up control. However, an occurrence of such a tumble flow means that the discharged spark easily extends in the tumble flow direction and that the flame kernel and the initial flame are easy to move in the same direction. FIG. 6A illustrates a cylinder condition in which the discharged spark is largely extended in the tumble flow direction and the flame kernel is largely flowed in the same direction. When the cylinder condition is in the state shown in FIG. 6A, the distance from the closest fuel spray to the discharged spark or the distance from the closest fuel spray to the flame kernel are increased. Therefore, it is difficult for the initial flame to involve the closest fuel spray and thus the initial combustion becomes unstable.

Figure 6B:
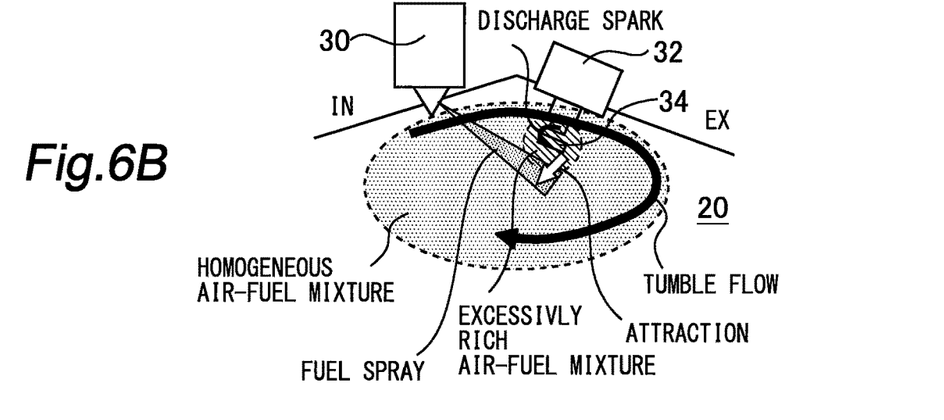
Figure 6C:
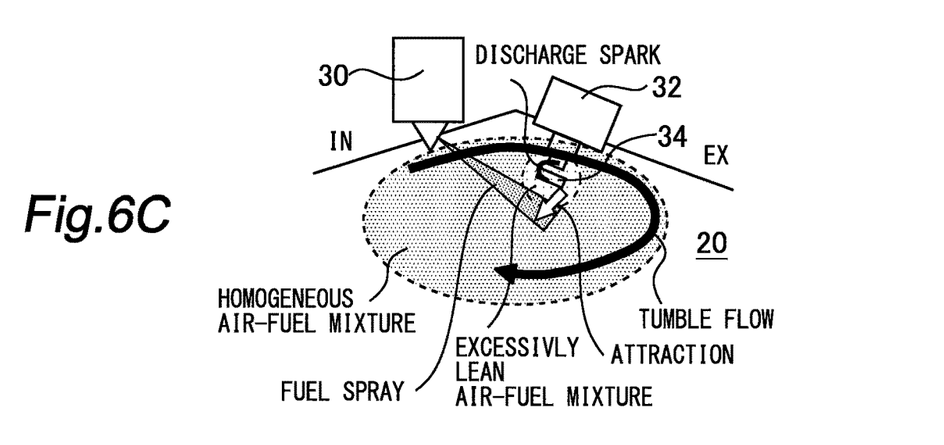

Besides the high tumble ratio TR, there are other factors that make the initial combustion unstable. For example, when air-fuel ratio of the homogeneous air-fuel mixture around the electrode portion or the discharged spark is not appropriate, the initial combustion tends to become unstable. FIG. 6B illustrates a cylinder condition when the air-fuel ratio of the homogeneous air-fuel mixture around the electrode portion is excessively rich. When the cylinder condition is in the state shown in FIG. 6B, small amount of air makes it difficult to accelerate combustion in the cylinder. Therefore, even when the discharged spark can be attracted by the expansion stroke injection, the initial combustion becomes unstable. FIG. 6C illustrates a cylinder condition when the air-fuel ratio of the homogeneous air-fuel mixture around the electrode portion is excessively lean. When the cylinder condition is in the state shown in FIG. 6C, the initial flame tends to disappear. Therefore, even when the discharged spark can be attracted by the expansion stroke injection, the initial combustion becomes unstable.

[Characteristics of Catalyst Warm-up Control in First Embodiment]

When such an unstable state occurs frequently in the combustion cycle during the catalyst warm-up control, combustion fluctuation between cycles increases to affect performance of the engine. Therefore, in the present embodiment, a determination processing about stability of the initial combustion is executed during the catalyst warm-up control. And when it is determined that the initial combustion is unstable, an engine control is performed to increase engine speed forcibly.

Figure 7:
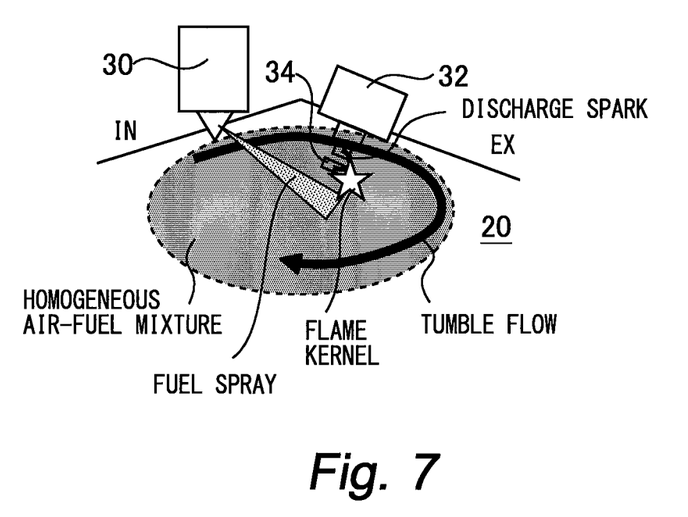
FIG. 7 is a view for describing an overview of the catalyst warm-up control according to the first embodiment of the present disclosure.

FIG. 7 is a view for describing an overview of the catalyst warm-up control according to the first embodiment. As described above, in the present embodiment, when it is determined that the initial combustion is unstable, the engine speed is forcibly increased. When the engine speed is forcibly increased, fluidity in the cylinder increases. When the fluidity in the cylinder rises, homogeneity of the homogeneous air-fuel mixture is improved. Therefore, as shown in FIG. 7, it is possible to enlarge the flame kernel. When the flame kernel is enlarged, the initial flame resulting from the flame kernel is also enlarged. Then, the initial flame becomes easy to involve the closest fuel spray thereby the initial combustion can be stabilized.

A forced rise in the engine speed is realized by changing a target torque. The target torque before this change equals to a target torque set at engine start. In general, the target torque during a catalyst warm-up control is held at the same value as the target torque set at engine start. Therefore, the engine speed during such a conventional catalyst warm-up control becomes substantially constant (see FIG. 2). On the other hand, the target torque after the change in the present embodiment is set to a value higher than the target torque set at the engine start. When the target torque is changed to a high value, an intake air amount is increased which increases in the engine speed. Since the change of the target torque to the high value does not depend on a transmission of an engine, it is preferable means for increasing the engine speed. As another means, when the engine has a rotating machine (for example, a motor generator) for rotating the crankshaft, it is possible to raise the engine rotation speed by the rotating machine.

The determination processing about stability of the initial combustion is executed based on a SA-CA 10. The SA-CA 10 is defined as a crank angle period from a starting point of the initial combustion (crank angle CA0) which starts behind a starting point of an ignition timing (that is, the discharge start timing at the electrode portion) to a combustion point in which mass fraction burned (MFB) reaches 10% (crank angle CA10). Note that, the MFB is calculated based on a result of analyzing in-cylinder pressure data that is obtained utilizing the in-cylinder pressure sensor 42 and the crank angle sensor 44, and SA-CA10 is calculated based on the calculated MFB. A method for calculating MFB based on the analysis result and a method for calculating the SA-CA 10 based on the calculated MFB are described in detail in, for example, JP 2015-094339 A and JP 2015-098799 A, and hence a description thereof is omitted from the present description.

Figure 8:
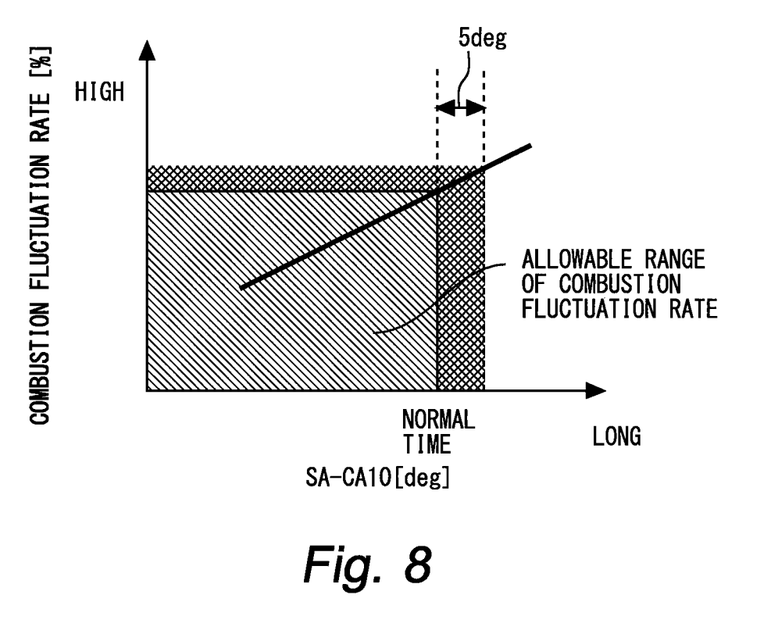
FIG. 8 is a view for illustrating a relation between the combustion fluctuation rate and SA-CA10.

As understood from the definition of the SA-CA 10, the fact that a value of the SA-CA 10 is small means that a period from MFB 0% to 10% is short. Conversely, if the value of the SA-CA 10 is large, it means that the period from MFB 0% to 10% is long. FIG. 8 is a view for illustrating a relation between the combustion fluctuation rate and SA-CA10. As shown in FIG. 8, when the SA-CA 10 becomes longer, the combustion fluctuation rate becomes larger and exceeds an allowable range.

In the catalyst warm-up control of the present embodiment, a difference between the SA-CA10 that is actually calculated by the ECU 40 (hereunder, also referred to as "actual SA-CA10") and the SA-CA10 at normal time is calculated over several tens to hundred cycles after the start of the catalyst warm-up control. Then, when an average of the differences is longer than a predetermined crank angle (for example, 5 degree) or more, it is determined that the initial combustion is unstable. Note that the SA-CA10 at normal time is set in advance by way of an adoption.

[Specific Processing in First Embodiment]

Figure 9:
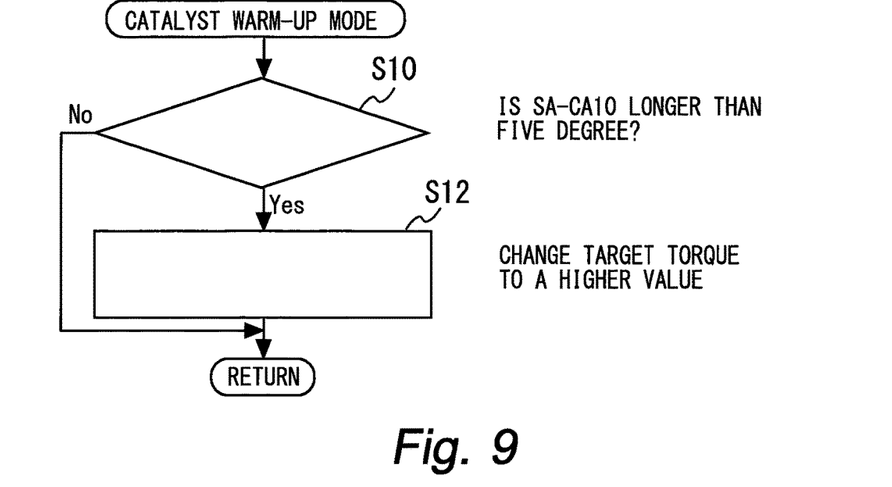
FIG. 9 is a flowchart for illustrating an example of processing that an ECU 40 executes in the first embodiment of the present disclosure.

FIG. 9 is a flowchart for illustrating an example of processing that the ECU 40 executes in the first embodiment. Note that the routine shown in FIG. 9 is repeatedly executed during a period in which an operation mode that executes the catalyst warm-up control (hereinafter also referred to as "catalyst warm-up mode") is selected. The catalyst warm-up mode is selected when various prerequisites are satisfied. The preconditions include that there is no abnormality in the system, that a warm-up requirement condition is satisfied, and that a safety condition is satisfied. The warm-up requirement condition includes that the coolant temperature or the oil temperature is within a predetermined range. The safety condition includes that there is no request for prohibiting the execution of the catalyst warm-up control.

In the routine illustrated in FIG. 9, first, it is determined whether or not the actual SA-CA10 is longer than the SA-CA10 at normal time by the predetermined crank angle period or more (step S10). In the step S10, the ECU 40 calculates the actual SA-CA10 and the average of the differences between the actual SA-CA10 and the SA-CA10 at normal time (a fixed value). When the determination result of the step S10 is negative, it is determined that there is no particular problem in the initial combustion. Therefore, in this case, the ECU 40 exits the present routine.

On the other hand, when the determination result of the step S10 is positive, it is determined that the initial combustion is stable. Therefore, in this case, the ECU 40 sets the target torque a value higher than the one set at the engine start (step S12). Hereby the engine speed is increased in accompany with the rise in the target torque and thus the homogeneity of the homogeneous air-fuel mixture in the cylinder is improved.

As described above, according to the routine illustrated in FIG. 9, the determination processing about stability of the initial combustion is executed based on the actual SA-CA10. Further, when it is determined that the initial combustion is unstable, the engine speed is increased by changing the target torque to the higher value. Therefore, the initial combustion during the catalyst warm-up mode can be stabilized.

Note that in the first embodiment, the intake stroke injection corresponds to the "first injection" of the present disclosure. The expansion stroke injection executed during the catalyst warm-up mode corresponds to the "second injection" of the present disclosure. The SA-CA10 corresponds to the "parameter relative to stability of the initial combustion" of the present disclosure.

Second Embodiment

Next, a second embodiment of the present disclosure will be described referring to FIG. 10 and FIG. 11.

[Characteristics of Catalyst Warm-up Control in Second Embodiment]

In the catalyst warm-up control of the first embodiment, when it is determined that the initial combustion is unstable, the target torque is set to a value higher than the target torque set at the engine start. However, despite of the change in the target torque, the initial combustion may not stabilize in some cases. Then, in the present embodiment, the determination processing about stability of the initial combustion is executed again. And when it is determined again that the initial combustion is unstable, a fuel injection amount for the intake stroke injection is increased while holding the change in the target torque to the high value. When the fuel injection amount for the intake stroke injection is increased, fuel concentration of the homogeneous air-fuel mixture is increased. When the fuel concentration is increased, the initial combustion is stabilized under a condition where the air-fuel ratio of the homogeneous air-fuel mixture around the electrode portion is excessively lean (see FIG. 6C).

However, when the injection period of the intake stroke injection is simply extended, the air-fuel ratio of the homogeneous air-fuel mixture around the electrode portion may become excessively rich. In such a case, the problem illustrated in FIG. 6B is newly developed. Further, when the injection period is simply extended, the injected fuel tends to adhere to a wall of the combustion chamber. Then, another problem raises in which number of particles PN, one of the objects of emission control, is increased. Therefore, in the present embodiment, the injection period is extended and also is divided into two times.

Figure 10:
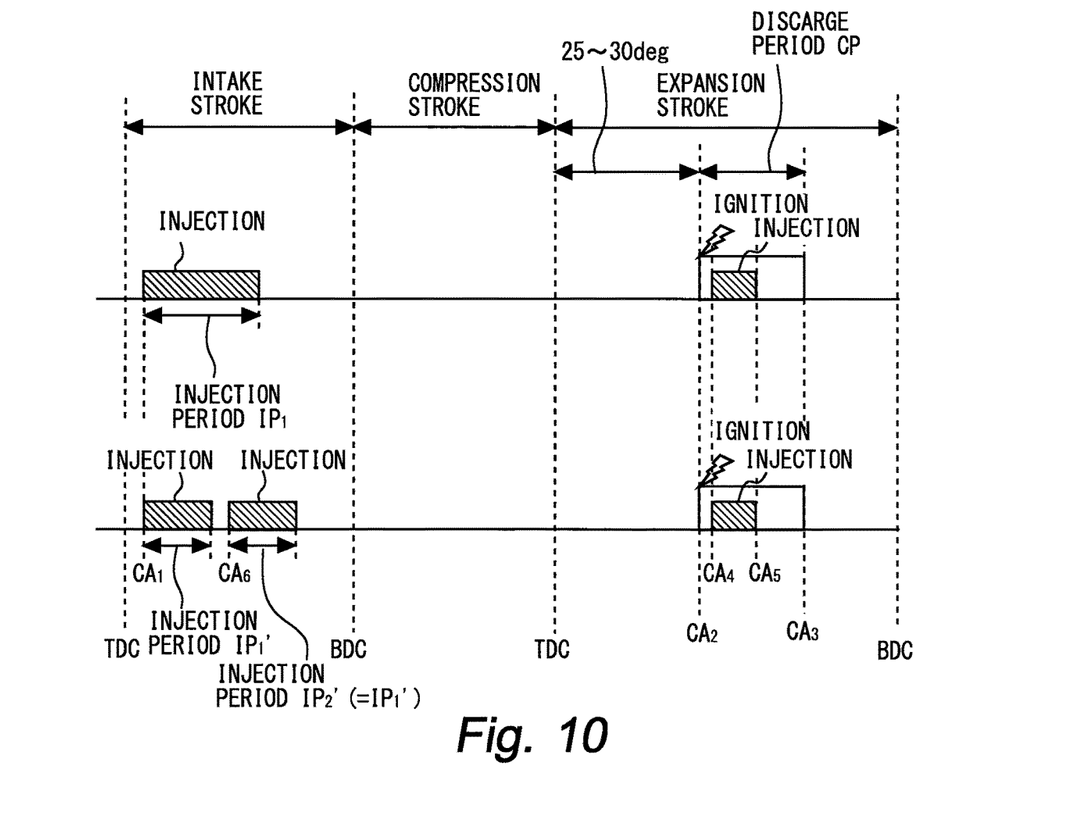
FIG. 10 is a view for describing an overview of the catalyst warm-up control according to a second embodiment of the present disclosure.

FIG. 10 is a view for describing an overview of the catalyst warm-up control according to the second embodiment. The lower diagram of FIG. 10 is the overview of the catalyst warm-up control according to the present embodiment. The catalyst warm-up control according to the first embodiment is also shown in the upper diagram of FIG. 10 as a comparative control. Comparing the lower and the upper diagrams, it is understood that the catalyst warm-up control according to the present embodiment is different from that of the first embodiment in that the injection period of the intake stroke injection is divided into two times. A first injection period $IP_1'$ is set to the same length as a second injection period $IP_2'$. Both of the two periods are shorter than an injection period $IP_1$ shown in the upper diagram. However, the total length of the injection periods $IP_1'$ and $IP_2'$ is longer than that of the injection period $IP_1$. The injection period $IP_2'$ is started at a crank angle $CA_6$.

As already mentioned that the fuel concentration of the homogeneous air-fuel mixture is increased when the fuel injection amount for the intake stroke injection is increased. Therefore, when the intake stroke injection is divided into two times, homogeneity of the homogeneous air-fuel mixture is improved. When dividing the intake stroke into two times, it is also possible to suppress adhesion of the injected fuel to the wall of the combustion chamber. Consequently, according to the present embodiment, it is possible to stabilize the initial combustion while suppressing an increase in the particle number PN.

Note that determination processing about stability of the initial combustion is executed basically the same as the first embodiment. That is, in the present embodiment, the difference between the actual SA-CA10 and the SA-CA10 at normal time is calculated over several tens to hundred cycles after the target torque is changed to the high value. Then, when the average of the differences is longer than the predetermined crank angle (for example, 5 degree) or more, it is determined that the initial combustion is still unstable.

[Specific Processing in Second Embodiment]

Figure 11:
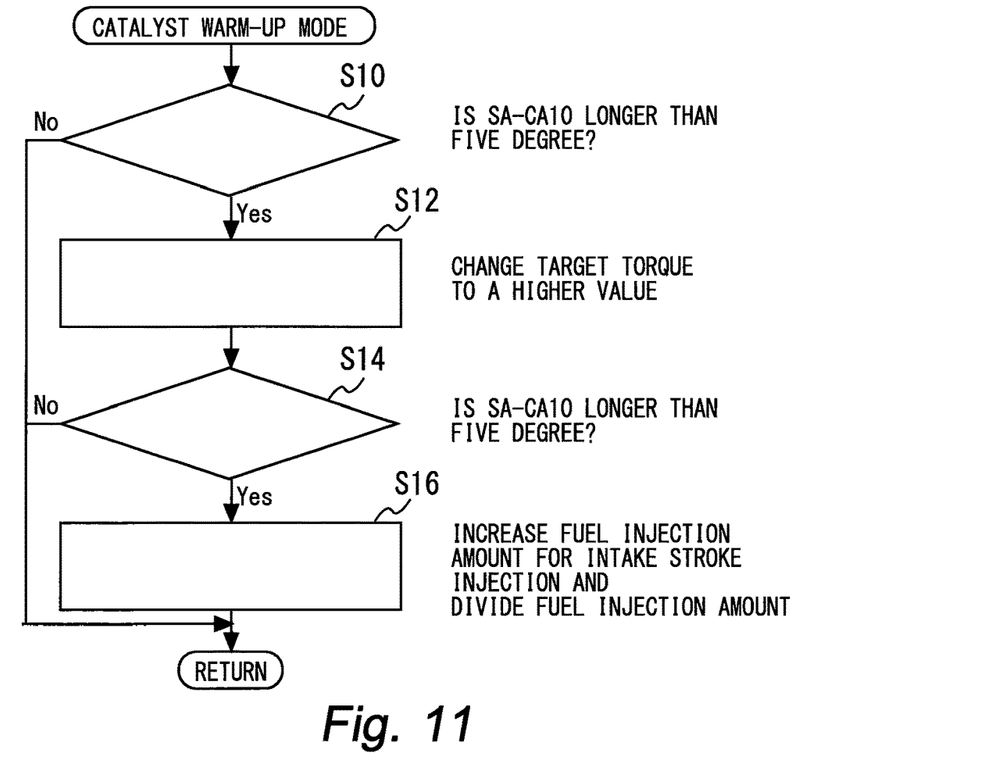
FIG. 11 is a flowchart for illustrating an example of processing that an ECU 40 executes in the second embodiment of the present disclosure.

FIG. 11 is a flowchart for illustrating an example of processing that the ECU 40 executes in the second embodiment. Note that the routine shown in FIG. 11 is repeatedly executed during a period in which the catalyst warm-up mode is selected.

In the routine shown in FIG. 11, the ECU 40 appropriately executes processing of the steps S10 and S12. The processing of these steps S10 and S12 is the same as described in FIG. 9.

Subsequent to the step S12, it is determined whether or not the actual SA-CA10 is longer than the SA-CA10 at normal time by the predetermined crank angle period or more (step S14). In the step S14, the ECU 40 compares the actual SA-CA10 with the SA-CA10 at normal time by calculating the average of the differences between them. When the determination result of the step S14 is negative, it is determined that the initial combustion becomes stable as a consequence in the target torque change. Therefore, in this case, the ECU 40 exits the present routine.

On the other hand, when the determination result of the step S14 is positive, it is determined that the initial combustion is still unstable despite of the change in the target torque. Therefore, in this case, the ECU 40 controls the injector so that the fuel injection amount of the intake stroke injection is increased while the intake stroke injection is divided into two times. Then, the fuel concentration and homogeneity of homogeneous air-fuel mixture in the cylinder is increased.

As described above, according to the routine illustrated in FIG. 11, the initial combustion during the catalyst warm-up mode can be stabilized. Further, when it is determined that the initial combustion is not fully stabilized despite of the change in the target torque, the fuel injection amount of the intake stroke injection is increased while the intake stroke injection is divided into two times. Therefore, the initial combustion during the catalyst warm-up mode can be stabilized with high probability.

Other Embodiment

In the first and the second embodiments, the engine configuration is adopted in which the tumble flow in the combustion chamber 20 swirls on the exhaust port 24 side so as to travel from the upper portion of the combustion chamber 20 toward the lower portion thereof, and swirls on the intake port 22 side so as to travel from the lower portion of the combustion chamber 20 toward the upper portion thereof. However, an engine configuration may be adopted in which the tumble flow swirls in the opposite direction. However, in this case, it is necessary to change the location at which the spark plug 32 is arranged from the exhaust valve 28 side to the intake valve 26 side. If the location at which the spark plug 32 is arranged is changed in this manner, the spark plug 32 will be positioned on the downstream side of the injector 30 in the flow direction of the tumble flow thereby the attraction action caused by the expansion stroke injection is obtained.

In the first and the second embodiments, a determination with respect to the stability of the initial combustion is performed based on the SA-CA10. However, instead of the SA-CA10, the determination may be performed based on a variation (standard deviation) σ of Gat 30. The crank shaft has a rotor of which teeth is provided with intervals of 30° CA. And the crank angle sensor 44 is configured to emit a signal every time the rotor rotates by 30° CA. The Gat 30 is calculated as the time between the two of the signals, that is, the time required for the crankshaft to rotate 30° CA.

Furthermore, not limited to the Gat 30 and the SA-CA10, the time required for the crankshaft to rotate 60° CA (Gat60), a crank angle period from the start timing of the ignition period until the MFB reaches 5% (SA-CA5), and a crank angle period from the start timing of the ignition period until the MFB reaches 15% (SA-CA15) may be used. As described above, any parameter having a correlation with the stability of the initial combustion may be used for the determination on that.

Figure 12:
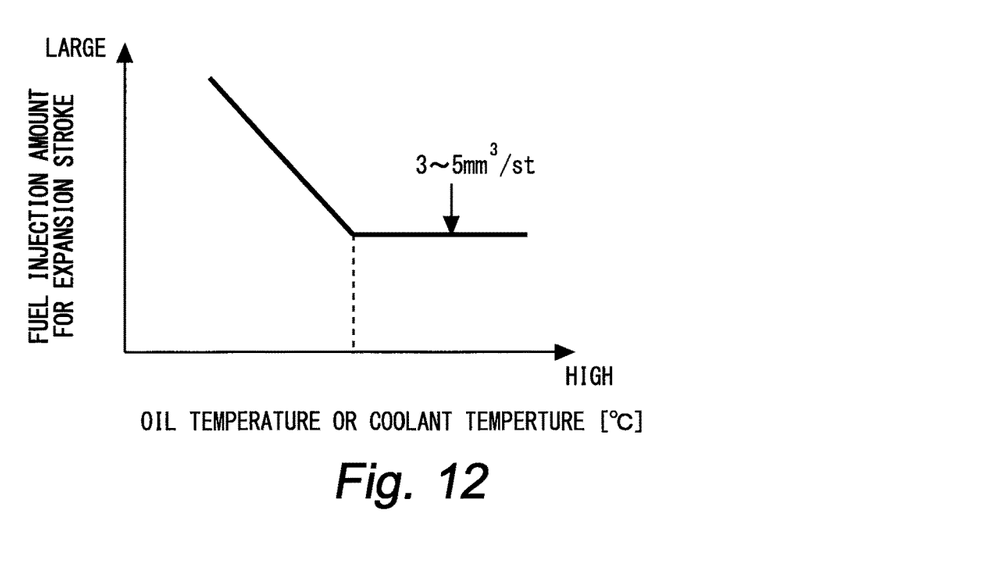
FIG. 12 is a view for illustrating a relation between fuel injection amount for the expansion stroke injection and temperature of engine coolant or engine oil.

In the second embodiment, the fuel injection amount of the intake stroke injection is increased when the determination result with respect to the stability of the initial combustion which is obtained after the change in the target torque is positive. However, the fuel injection amount of the expansion stroke injection may be increased instead of increasing the fuel injection amount of the intake stroke injection. When the fuel injection amount of the expansion stroke injection is increased, it is possible to enhance the attraction action toward the initial flame and the like. Therefore, it is possible to stabilize the initial combustion under a condition where the problem due to the high tumble ratio TR occurs (see FIG. 6A). In this connection, FIG. 12 is a view for illustrating a relation between fuel injection amount for the expansion stroke injection and temperature of engine coolant or engine oil. As shown in FIG. 12, the fuel injection amount for the expansion stroke injection may be increased so that the coolant temperature of the oil temperature becomes lower. When the fuel injection amount for the expansion stroke injection is increased, it is possible to secure the vaporized fuel necessary for the generation of the initial flame even in a low temperature environment. Moreover, the increase in fuel injection amount described in FIG. 12 may be added to the increase in the fuel injection amount performed in the second embodiment.

In the second embodiment, the injection period of the intake stroke injection is extended and also is divided into two times when the determination result with respect to the stability of the initial combustion which is obtained after the change in the target torque is positive. However, only the injection period of intake stroke injection may be divided without extending the injection period. Unless the injection period of the intake stroke injection is extended, the fuel concentration of the homogeneous air-fuel mixture will not change. However, at least homogeneity of the homogeneous air-fuel mixture can be increased by the division of the injection period thereby the initial combustion can be stabilized. Furthermore, the injection period of intake stroke injection may be divided into three or more times. That is, the intake stroke injection may be performed three times or more.

REFERENCE EXAMPLES

Hereinafter, a first to a fourth comparative reference examples which were considered in the course of the present disclosure will be described. Note that the same reference numerals are given to the same constituent elements as those of the above-described embodiments 1 and 2, and the explanation thereof will be omitted.
[Description of System Configuration]
In each of the systems according to the first to the fourth reference examples, it is assumed a system in which a port injector is added to the system configuration shown in FIG. 1. The port injector is assumed to be provided in the intake port 22 shown in FIG. 1. The port injector is assumed to be included in the actuator operated by the ECU 40 shown in FIG. 1. When the injector 30 shown in FIG. 1 is opened, fuel is directly injected into the combustion chamber 20. On the other hand, when the port injector is opened, fuel is injected to the intake port 22. The fuel spray from the port injector is mixed with intake air in the intake port 22 to form an air-fuel mixture. The air-fuel mixture in the intake port 22 flows into the combustion chamber 20 as the intake valve 26 shown in FIG. 1 is opened.

First Reference Example

Figure 13:
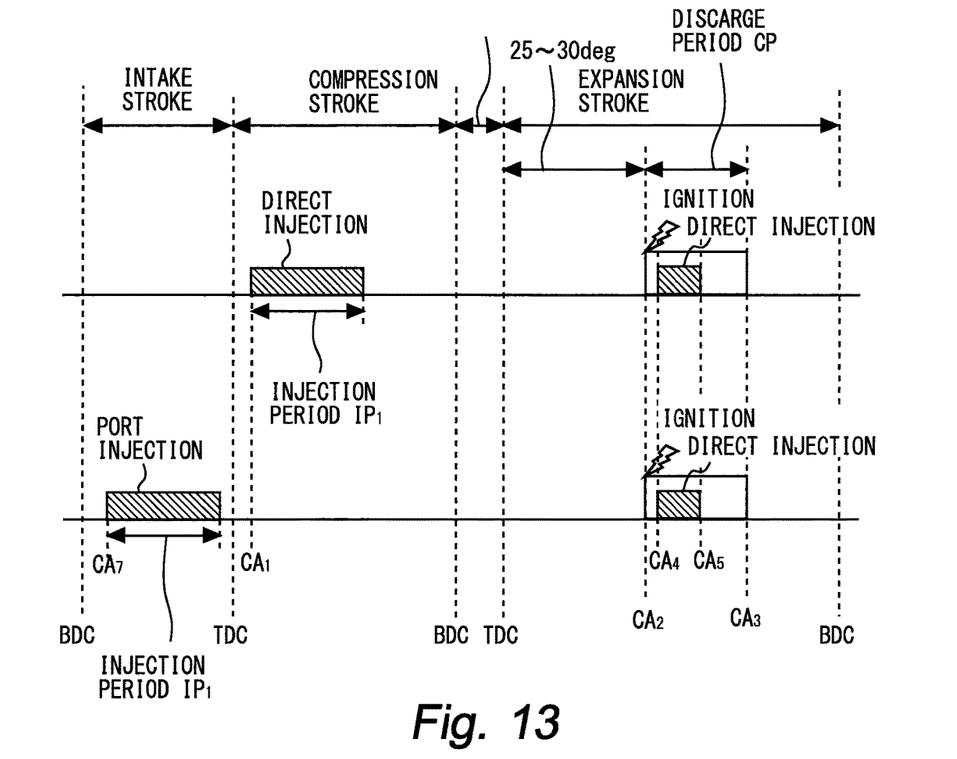
FIG. 13 is a view for describing an overview of the catalyst warm-up control according to a first reference example of the present disclosure.

[Characteristics of Catalyst Warm-up Control in First Reference Example]
As in the first and second embodiments, in the first reference example, the determination processing about the stability of the initial combustion is executed during the catalyst warm-up control. However, in the present example, an injection in an exhaust stroke using the port injector (hereinafter also referred to as "exhaust stroke injection") is performed when it is determined that the initial combustion is unstable. FIG. 13 is a view for describing an overview of the catalyst warm-up control according to the first reference example. The lower diagram of FIG. 13 is the overview of the catalyst warm-up control according to the present example. The catalyst warm-up control according to the first embodiment is also shown in the upper diagram of FIG. 13 as a comparative control. Comparing the lower and the upper diagrams, it is understood that the catalyst warm-up control according to the present example is different from that of the first embodiment in that the exhaust stroke injection with the port injector is performed which corresponds to the intake stroke injection performed in the first embodiment. The exhaust stroke injection is started at a crank angle $CA_7$.

The air-fuel mixture formed by the exhaust stroke injection is superior in homogeneity to the air-fuel mixture formed by the intake stroke injection. Therefore, when it is determined that the initial combustion is unstable, when the exhaust stroke injection is performed instead of the intake stroke injection, the homogeneity of the air-fuel mixture is improved. Therefore, like the case illustrated in the FIG. 7, it is possible to enlarge the flame kernel thereby the initial combustion can be stabilized.

Second Reference Example

Figure 14:
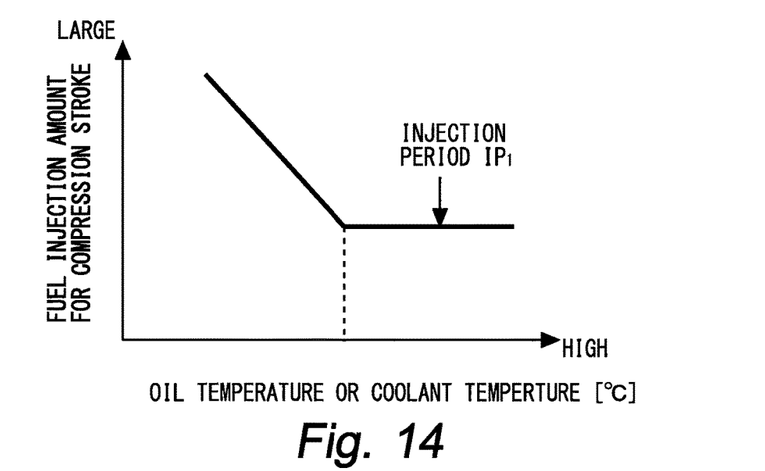
FIG. 14 is a view for illustrating a relation between fuel injection amount for an expansion stroke injection and temperature of engine coolant or engine oil.

[Characteristics of Catalyst Warm-up Control in Second Reference Example]
In the second reference example, fuel injection amount for the exhaust stroke injection described in the first reference example is changed in accordance with the coolant temperature or the oil temperature. FIG. 14 is a view for illustrating a relation between injection period (i.e. fuel injection amount) of the expansion stroke injection and temperature of engine coolant or engine oil. As shown in FIG. 14, in the second reference example, the injection period of the expansion stroke injection is increased as the coolant temperature or the oil temperature decreases. By prolonging the injection period of the exhaust stroke injection in this way, it is possible to secure vaporized fuel necessary for the generation of the initial flame even in the low temperature environment.

Third Reference Example

Figure 15:
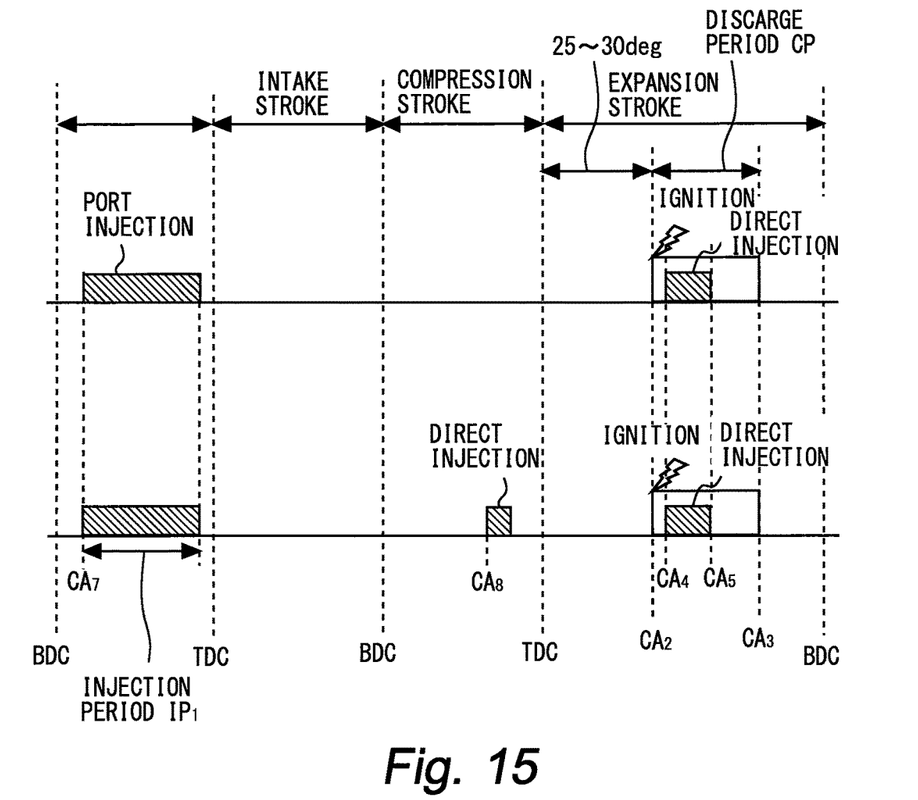
FIG. 15 is a view for describing an overview of the catalyst warm-up control according to a third reference example of the present disclosure.

[Characteristics of Catalyst Warm-up Control in Third Reference Example]
In the third reference example, a fuel injection for a compression stroke using the injector 30 shown in FIG. 1 (hereinafter referred to as a "compression stroke injection") is performed when it is determined that the initial combustion is still unstable despite of performing the exhaust stroke injection described in the first reference example. FIG. 15 is a view for describing an overview of the catalyst warm-up control according to the third reference example. The lower diagram of FIG. 15 is the overview of the catalyst warm-up control according to the present example. The catalyst warm-up control according to the first reference example is also shown in the upper diagram of FIG. 15. Comparing the lower and the upper diagrams, it is understood that the catalyst warm-up control according to the present example is different from that of the first reference example in that the compression stroke injection is performed other than the exhaust stroke injection and the expansion stroke injection. The compression stroke injection is started at a crank angle $CA_8$.

When the compression stroke injection is performed, fuel concentration of the homogeneous air-fuel mixture around the electrode portion is increased. Therefore, the initial combustion is stabilized under a condition where the air-fuel ratio of the homogeneous air-fuel mixture around the electrode portion is excessively lean (see FIG. 6C).

Fourth Reference Example

[Characteristics of Catalyst Warm-up Control in Fourth Reference Example]

Figure 16:
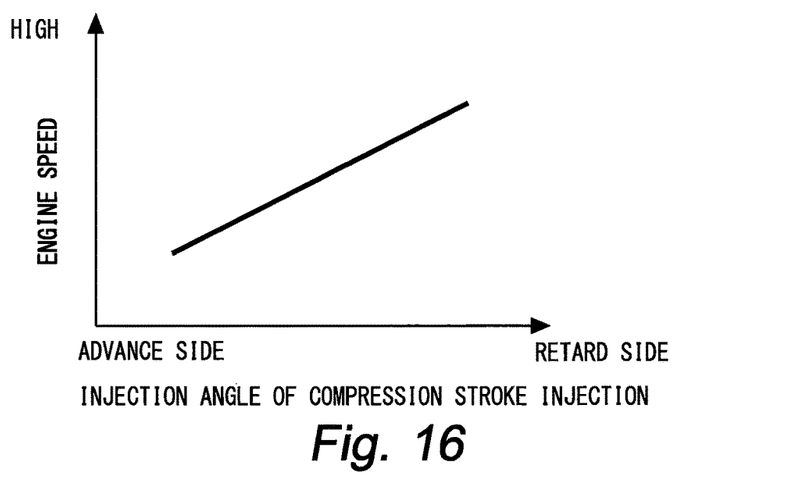
FIG. 16 is a view for illustrating a relation between start timing of a compression stroke injection and engine speed.

In the catalyst warm-up control in the fourth reference example, the crank angle $CA_8$ at which the compression stroke injection described in the third reference example is started is changed in accordance with the engine speed. FIG. 16 is a view for illustrating a relation between start timing of the compression stroke injection and the engine speed. As shown in FIG. 16, as the engine speed increase, the start timing of the compression stroke injection (i.e. the crank angle $CA_8$) is changed to the crank angle on the more retarded sides. By changing the start timing of the compression stroke injection in this manner, it is possible to reliable increase the homogeneous air-fuel mixture around the electrode portion during the discharge period CP.

What is claimed is:

1. A control device for controlling an internal combustion engine which is configured to control an engine,
   wherein the engine comprising:
   an injector which is provided in an upper portion of a combustion chamber where tumble flow is generated, the injector is configured to inject fuel into a cylinder from multiple injection ports;
   a spark plug which is provided at the upper portion and is configured to ignite a fuel-air mixture inside the cylinder by using a discharge spark, the spark plug is provided on a downstream side relative to the injector in a tumble flow direction at the upper portion, the spark plug is located at the downstream side of closest fuel spray among the fuel sprays injected from the multiple injection ports and is located closer to the upper portion than a contour surface of the closest fuel spray; and
   an exhaust gas cleaning catalyst that is configured to clean exhaust gas from the combustion chamber,
   wherein the control device is configured to perform an engine control for activating the exhaust gas cleaning catalyst in which the spark plug and the injector are controlled, the spark plug is controlled so as to generate discharge spark at an ignition period on a retard side of compression top dead center, the injector is controlled so that a first injection is performed on an advance side of the compression top dead center and a second injection whose injection period is overlapped with at least a part of the ignition period is performed on the retard side of the compression top dead center,
   wherein the control device is further configured to perform an engine control in which rotation speed of the engine is forcibly increased when it is determined that a parameter relative to stability of the initial combustion exceeds a threshold.

2. The control device according to claim 1,
   wherein the control device is further configured to perform an engine control in which the injector is controlled so that injection amount for the first injection is increased when it is determined, in cycles after increasing the rotation speed of the engine, that the parameter exceeds the threshold again.

3. The control device according to claim 1,
   wherein the control device is further configured to perform an engine control in which the injector is controlled so that the first injection is performed a plurality of times when it is determined, in cycles after increasing the rotation speed of the engine, that the parameter exceeds the threshold again.

* * * * *